US011852881B2

(12) United States Patent
Luo et al.

(10) Patent No.: US 11,852,881 B2
(45) Date of Patent: Dec. 26, 2023

(54) MULTI-CHANNEL PARALLEL OPTICAL COMMUNICATION MODULE AND OPTICAL TRANSCEIVER HAVING THE SAME

(71) Applicant: Global Technology Inc., Ningbo (CN)

(72) Inventors: Jian-Hong Luo, Ningbo (CN); Lai-Wei Lu, Ningbo (CN); Xiang Zheng, Ningbo (CN); Daichao Song, Ningbo (CN)

(73) Assignee: Global Technology Inc., Ningbo (CN)

( * ) Notice: Subject to any disclaimer, the term of this patent is extended or adjusted under 35 U.S.C. 154(b) by 0 days.

(21) Appl. No.: 17/495,905

(22) Filed: Oct. 7, 2021

(65) Prior Publication Data

US 2023/0007886 A1 Jan. 12, 2023

(30) Foreign Application Priority Data

Jul. 12, 2021 (CN) .......................... 202110785170.5

(51) Int. Cl.
*G02B 6/26* (2006.01)
*G02B 6/44* (2006.01)
*H04B 10/50* (2013.01)
*H04B 10/2587* (2013.01)

(52) U.S. Cl.
CPC ......... *G02B 6/4446* (2013.01); *G02B 6/4452* (2013.01); *H04B 10/2587* (2013.01); *H04B 10/5053* (2013.01)

(58) Field of Classification Search
CPC .... G02B 6/4452; G02B 6/26; H04B 10/2587; H04B 10/5053
See application file for complete search history.

(56) References Cited

U.S. PATENT DOCUMENTS

| 7,106,978 | B2 * | 9/2006 | Nasu ..................... H04B 10/506 398/95 |
| 2017/0059796 | A1 * | 3/2017 | Huang ................. G02B 6/4251 |
| 2018/0149818 | A1 * | 5/2018 | Yamauchi ........... H01S 5/02251 |
| 2020/0043522 | A1 * | 2/2020 | Damaghi ............. G11C 13/042 |
| 2020/0073052 | A1 * | 3/2020 | Lin ....................... G02B 6/4254 |
| 2022/0255626 | A1 * | 8/2022 | Luo ........................ H04B 10/40 |

FOREIGN PATENT DOCUMENTS

CN 100419358 C * 9/2008

* cited by examiner

*Primary Examiner* — Jennifer Doan
(74) *Attorney, Agent, or Firm* — Grossman Tucker Perreault & Pfleger, PLLC

(57) ABSTRACT

A multi-channel parallel optical communication module includes a casing having an airtight cavity, an optical communication assembly accommodated in the airtight cavity, and a temperature controller in thermal contact with the optical communication assembly. The optical communication assembly includes a plurality of optical communication units disposed at same level, and a number of the plurality of optical communication units is greater than four.

15 Claims, 4 Drawing Sheets

MULTI-CHANNEL PARALLEL OPTICAL COMMUNICATION MODULE AND OPTICAL TRANSCEIVER HAVING THE SAME

CROSS-REFERENCE, TO RELATED APPLICATIONS

This non-provisional application claims priority under 35 U.S.C. § 119(a) on Patent Application No(s). 202110785170.5 filed in China on Jul. 12 2021, the entire contents of which are hereby incorporated by reference.

BACKGROUND

1. Technical Field

This present disclosure relates to optical communication, more particular to a multi-channel parallel optical communication module and optical transceiver having the same.

2. Related Art

Optical transceivers are generally installed in electronic communication facilities in modern high-speed communication networks. In order to make flexible the design of an electronic communication facility and less burdensome the maintenance of the same, an optical transceiver is inserted into a corresponding cage that is disposed in the communication facility in a pluggable manner. In order to define the electrical-to-mechanical interface of the optical transceiver and the corresponding cage, different form factors such as XFP (10 Gigabit Small Form Factor Pluggable) used in 10 GB/s communication rate, QSFP (Quad Small Form-factor Pluggable), or others at different communication rates have been made available.

With the development of communication system and the rapid growth of communication bandwidth demand for various network services, the conventional communication system faces two challenges: high density and low power consumption. As to the challenges, the optical communication module in the communication system is required to provide larger bandwidth and faster transmission rate with small size and low power consumption. Because the shape and size of optical communication module have been defined by a standard specification in the multi-source agreement (MSA), the sizes of the circuit board and the photoelectric component inside the module are also restricted.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
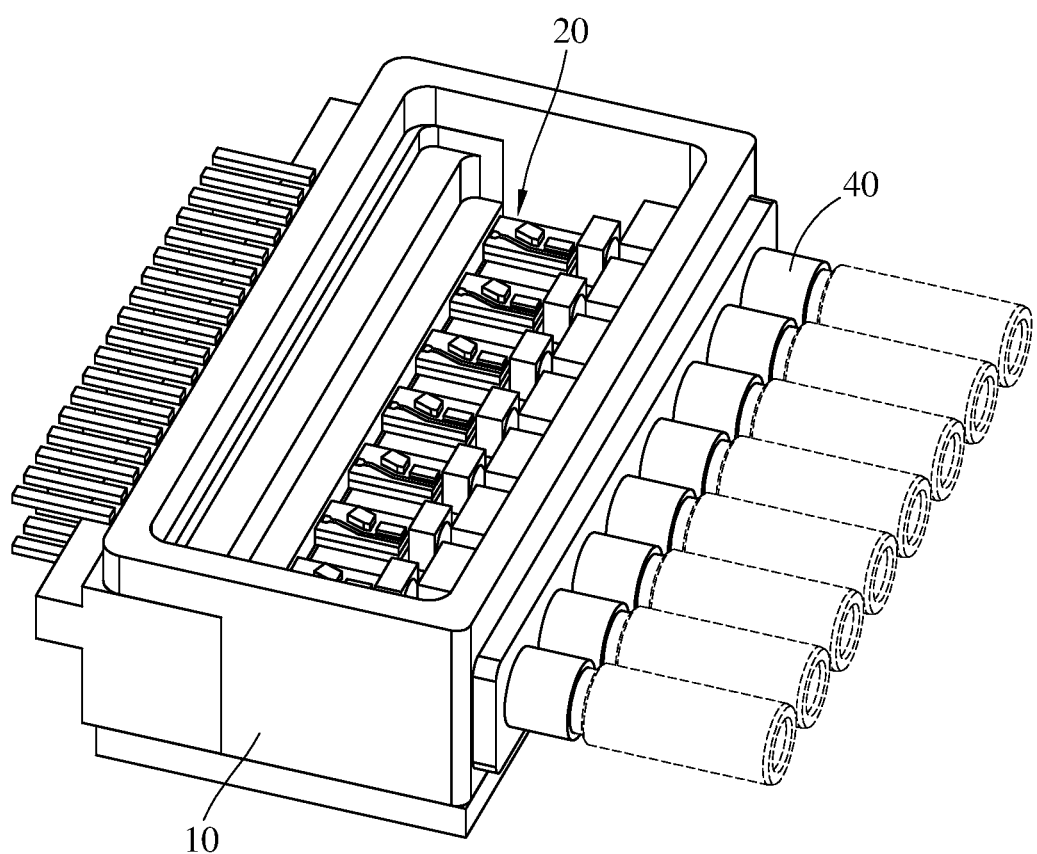
FIG. 1 is a perspective view of a multi-channel parallel optical communication module according to an embodiment of the present disclosure.
Figure 2:
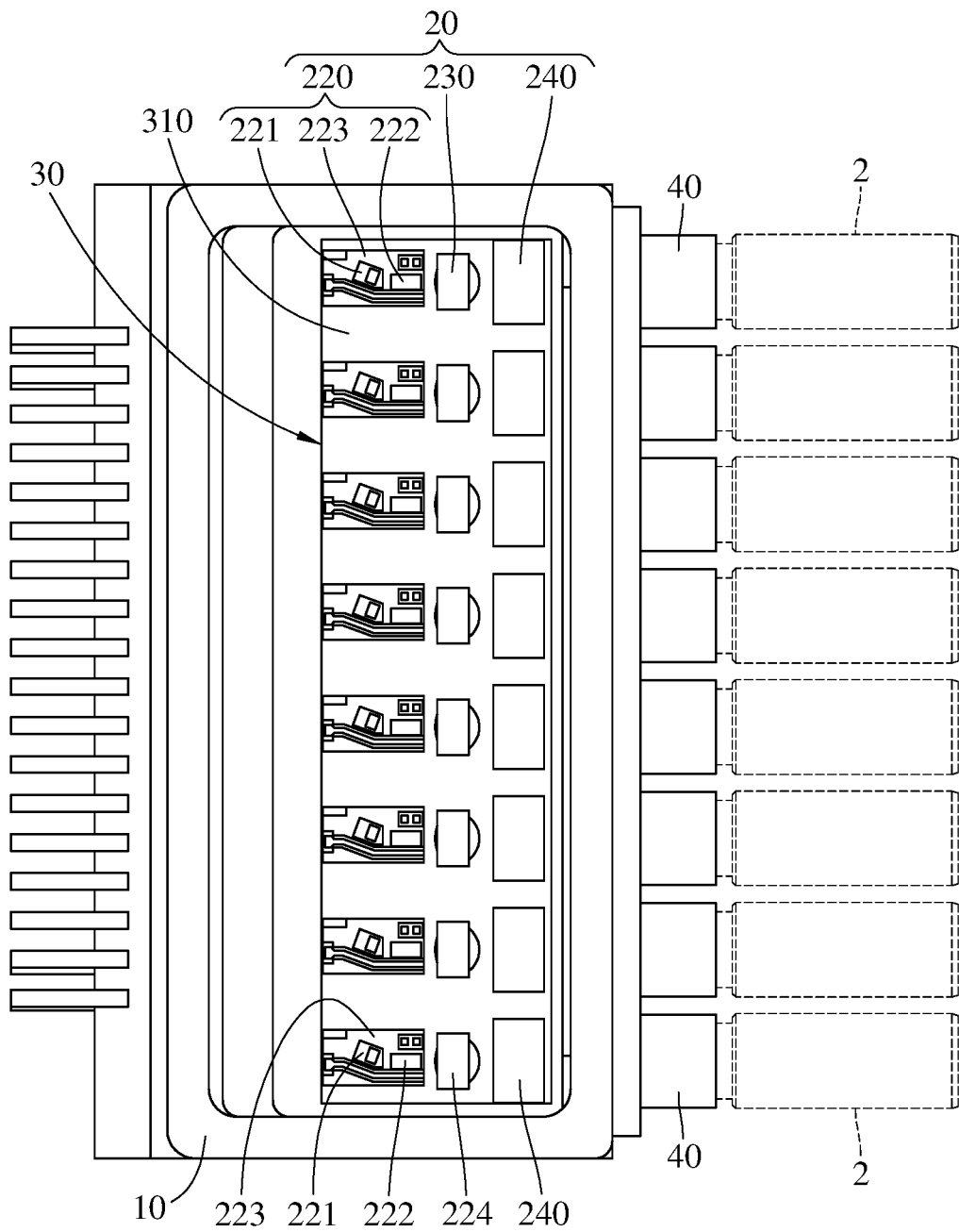
FIG. 2 is a top view from the interior of the multi-channel parallel optical communication module in FIG. 1.

Please refer to FIG. 1 and FIG. 2. FIG. 1 is a perspective view of a multi-channel parallel optical communication module according to an embodiment of the present disclosure, and FIG. 2 is a top view from the interior of the multi-channel parallel optical communication module in FIG. 1. In this embodiment, a multi-channel parallel optical communication module 1 includes a casing 10 and an optical communication assembly 20. The casing 10 is, for example but not limited to, a metal shell for packaging. For the purpose of illustration, a top portion of the casing 10 is omitted in FIG. 1 and FIG. 2 to show some components disposed inside the casing 10.

The optical communication assembly 20 is accommodated in a space 100 of the casing 10, and the optical communication assembly 20 includes a plurality of optical communication units 220. Please also refer to FIG. 3 which shows a side view from the interior of the multi-channel parallel optical communication module in FIG. 1. Each of the optical communication units 220 includes a backlight receiving photodiode 221, a laser diode 222 and a carrier 223. The laser diode 222 may be a directly modulated laser diode (DML), an electro-absorption modulated laser diode (EMl) or another edge emitting laser diode. The backlight receiving photodiode 221 and the laser diode 222 are disposed on the cannier 223. Also, in this embodiment, the optical communication assembly 20 further includes a plurality of focusing lenses 230. The focusing lenses 230 might correspond to the optical communication units 220 in number, and the focusing lenses 230 are aligned with respective laser diodes 222. It is noted that the optical communication assembly in the present disclosure is not limited to the optical communication assembly 20 including two types of active components such as backlight receiving photodiode 221 and laser diode 222. In some other embodiments, the optical communication assembly only includes laser diode 222.

In this embodiment, the multi-channel parallel optical communication module 1 further includes a temperature controller 30. The temperature controller 30 is, for example but not limited to, a thermocouple temperature controller accommodated in the space 100 of the casing 10 and in thermal contact with the carrier 223 of the optical communication assembly 20. More specifically, the temperature controller 30 is disposed between a bottom surface of the carrier 223 and a bottom inner surface 110 of the casing 10, and opposite sides of the temperature controller 30 are in thermal contact with the bottom surface of the carrier 223 and the bottom inner surface 110 of the casing 10, respectively. As such, the backlight receiving photodiode 221 and the laser diode 222 are disposed on one surface (top surface) of the carrier 223, and the temperature controller 30 is disposed on another surface (bottom surface) of the carrier 223. The carrier 223 of the optical communication assembly 20 is disposed on a top surface 310 of the temperature controller 30. The temperature controller 30 can help maintaining the internal temperature of the casing 10 at a certain range suitable for operation. The temperature controller 30 dissipates heat through the bottom of the casing 10.

In this embodiment, the space 100 formed inside the casing 10 is a cavity which is airtight with respect to the external environment around the casing 10, such that air and water in the external environment cannot enter into the casing 10. Thus, an interference in performance of the backlight receiving photodiode 221, the laser diode 222 and the temperature controller 30 inside the airtight cavity (space 100) by dust or water vapor can be prevented.

Figure 3:
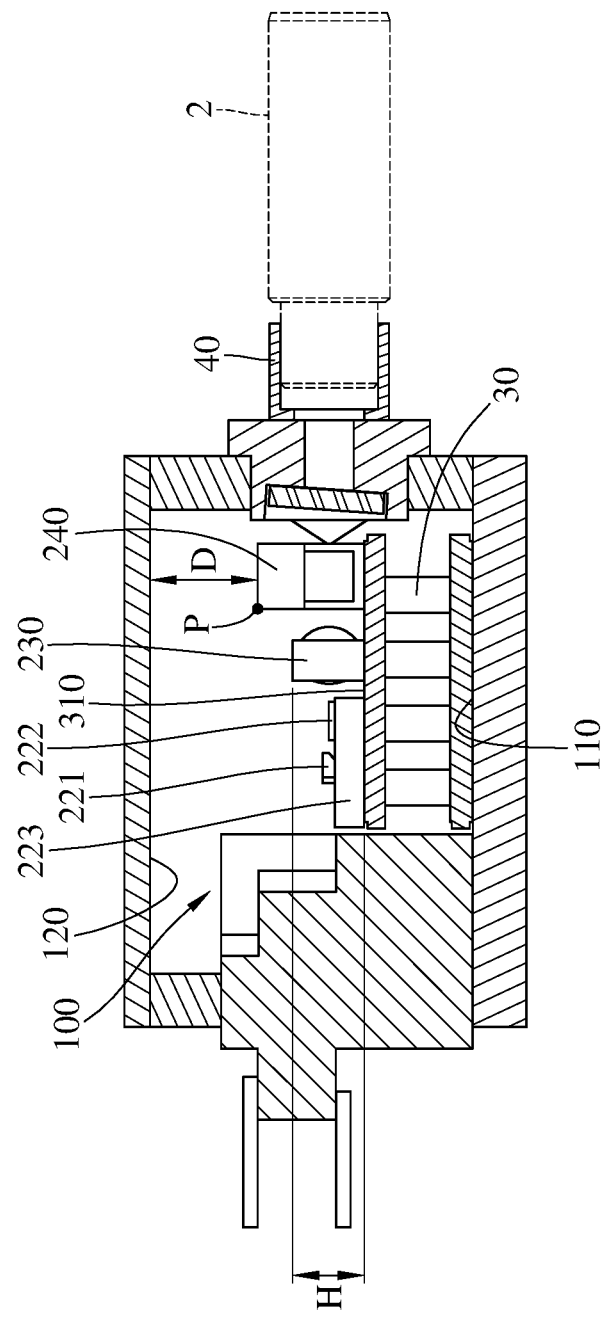
FIG. 3 is a side view from the interior of the multi-channel parallel optical communication module in FIG. 1.

In this embodiment, the optical communication units 220 are disposed on the same level, and the number of the optical communication units 220 is greater than four. As shown in FIG. 2 and FIG. 3, every optical communication unit 220 is disposed on the top surface 310 of the temperature controller 30, and the optical communication units 220 are substantially at the same vertical height in FIG. 3. In other words, bottoms of these optical communication units 220 are at the same level. More specifically, a total of eight optical communication units 220 is provided in this embodiment to constitute the multi-channel parallel optical communication module 1 having eight channels, while it is noted that the multi-channel parallel optical communication module in the present disclosure is not limited by the number of channels. In some other embodiments, the multi-channel parallel optical communication module 1 may have five to seven channels, or more than eight channels. Since the optical communication units 220 are disposed on the same level, the casing 10, which has been defined by standard specifications, enjoys more amount of space inside for accommodating photoelectric components and other functional components such as the temperature controller 30.

In this embodiment, the optical communication assembly 20 of the multi-channel parallel optical communication module 1 further includes a plurality of optical isolators 240 accommodated in the space 100 of the casing 10 and disposed on the top surface 310 of the temperature controller 30, and the optical isolators 240 might also correspond to the optical communication units 220 in number. In a case that the optical communication unit 220 includes a transmitter optical subassembly, the optical isolator 240 can restrict light emitted by the laser diode to travel along a particular direction. In a case that the optical communication unit 220 includes a receiver optical subassembly, the optical isolator 240 can enable the optical communication unit 220 to receive light traveling along a particular direction only.

In this embodiment, multi-channel parallel optical communication module 1 further includes a plurality of welding rings 40 connected to the casing 10, and the welding rings 40 might correspond to the optical communication units 220 in number. As shown in FIG. 2 and FIG. 3, each of the welding rings 40 is exposed to outside. An optical fiber adaptor 2 is inserted into the welding ring 40 and fixed with the welding ring 40 by laser beam welding so as to couple the optical fiber adaptor 2 with the optical communication unit 220 as well as maintain the space 100 of the casing 10 to remain airtight.

In this embodiment, a shortest distance between the optical communication assembly 20 and a top inner surface 120 of the casing 10 is smaller than a vertical height of the optical communication assembly 20. As shown in FIG. 3, a shortest distance D is defined between the optical communication assembly 20 and the top inner surface 120. The shortest distance D may be referred to as a shortest distance between the optical communication unit 220 of the optical communication assembly 20 and the top inner surface 120. A vertical height H of the optical communication assembly 20 itself may be referred to as a distance from the bottom surface of the carrier 223 to a position P on the optical communication unit 220 closest to the top inner surface 120. Consequently, the following condition can be satisfied: D<H. With the above arrangement, better utilization of the space 100 in the casing 10, and therefore installation of the temperature controller 30 in limited space under the requirement of multi-channels could be realized. FIG. 3 shows that the shortest distance D is defined between the optical isolator 240 of the optical communication unit 220 and the top inner surface 120, and a vertical height H of the optical communication assembly 20 is defined as the distance from the bottom surface of the carrier 223 to a top surface of the optical isolator 240, but the present disclosure is not limited thereto. In some other embodiments, based on various sizes of the photoelectric components, the shortest distance can be defined as a distance between the top inner surface 120 of the casing and one of the backlight receiving photodiode 221, the laser diode 222 and the focusing lens 230.

Figure 4:
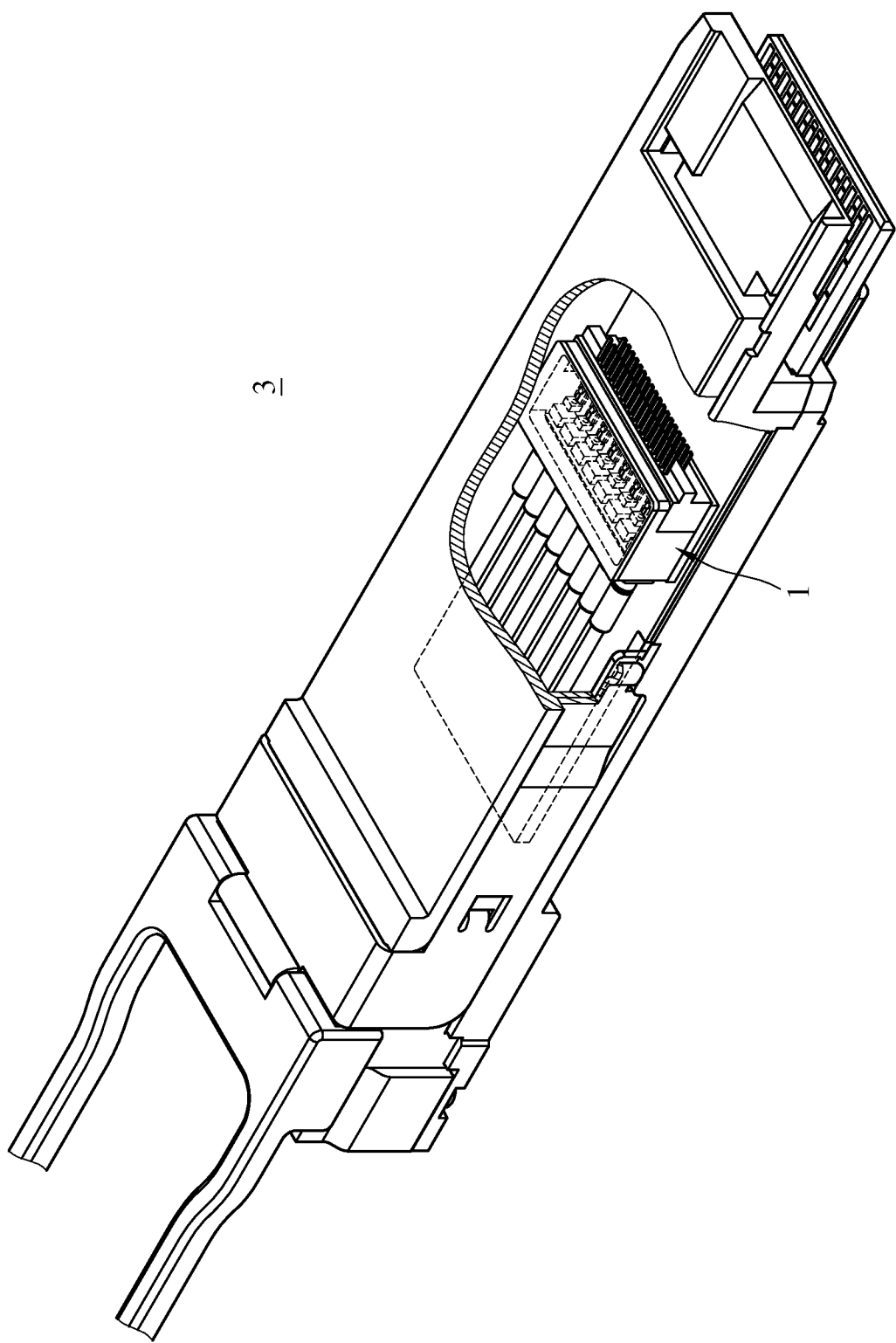
FIG. 4 is a perspective view of an optical transceiver according to an embodiment of the present disclosure.

FIG. 4 is a perspective view of an optical transceiver according to an embodiment of the present disclosure. In this embodiment, an optical transceiver 3 includes a housing and one or more optical communication components inside the housing. The one or more optical communication components inside the housing of the optical transceiver 3 includes the aforementioned multi-channel parallel optical communication module 1. FIG. 4 shows that the optical transceiver 3 includes two multi-channel parallel optical communication modules 1 functioning as a light transmitter and a light receiver, respectively. It is noted that the optical transceiver in the present disclosure is not limited by the number of multi-channel parallel optical communication modules disposed therein.

According to the present disclosure, multiple optical communication units are disposed at the same level. More specifically, these optical communication units are arranged at the same side of the temperature controller. Such configuration helps to accommodate more optical communication units in the casing, thereby achieving high-density channels. Moreover, since the optical communication units are disposed on the temperature controller without additional component therebetween, each optical communication unit can be in direct thermal contact with the temperature controller, such that the temperature controller can harmoniously control the temperature of each optical communication unit during operation. Furthermore, the space in the casing for accommodating the optical communication units could be an airtight cavity, which helps to prevent air and water (or other foreign objects) in the external environment from entering into the casing, thereby enhancing the reliability of the mufti-channel parallel optical communication module.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:
1. A multi-channel parallel optical communication module, comprising:
  a casing having an airtight cavity;
  an optical communication assembly accommodated in the airtight cavity, wherein the optical communication assembly comprises a plurality of optical communication units disposed at a same predetermined level, a plurality of optical isolators accommodated in the airtight cavity, and the plurality of optical isolators correspond to the plurality of optical communication units in number, and a number of the plurality of optical communication units is greater than four;

wherein a shortest distance between the optical communication assembly and a top inner surface of the casing is smaller than a vertical height of the optical communication assembly; and a temperature controller in thermal contact with the optical communication assembly.

2. The multi-channel parallel optical communication module according to claim 1, wherein the temperature controller comprises a thermocouple.

3. The multi-channel parallel optical communication module according to claim 1, wherein the number of the plurality of optical communication units is greater than or equal to eight.

4. The multi-channel parallel optical communication module according to claim 1, wherein the temperature controller is disposed between the plurality of optical communication units and part of the casing, and the temperature controller is in thermal contact with the plurality of optical communication units and the casing.

5. The multi-channel parallel optical communication module according to claim 1, wherein each of the plurality of optical communication units comprises a laser diode or a laser diode and a backlight receiving photodiode set.

6. The multi-channel parallel optical communication module according to claim 1, further comprising a plurality of welding rings connected to the casing, and the plurality of welding rings correspond to the plurality of optical communication units in number.

7. A multi-channel parallel optical communication module, comprising:

a casing;

an optical communication assembly accommodated in the casing, wherein the optical communication assembly comprises a plurality of optical communication units disposed at a same predetermined level, and a number of the plurality of optical communication units is greater than four; and wherein a shortest distance between the optical communication assembly and a top inner surface of the casing is smaller than a vertical height of the optical communication assembly.

8. The multi-channel parallel optical communication module according to claim 7, wherein the number of the plurality of optical communication units is greater than or equal to eight.

9. The multi-channel parallel optical communication module according to claim 7, further comprising a plurality of welding rings connected to the casing, and the plurality of welding rings corresponding to the plurality of optical communication units in number.

10. An optical transceiver, comprising the multi-channel parallel optical communication module according to claim 1.

11. The multi-channel parallel optical communication module according to claim 9 wherein the casing comprises an airtight cavity.

12. The multi-channel parallel optical communication module according to claim 7 further comprising a temperature controller in thermal contact with the optical communication assembly.

13. The multi-channel parallel optical communication module according to claim 12, wherein the temperature controller comprises a thermocouple.

14. The multi-channel parallel optical communication module according to claim 7, wherein each of the plurality of optical communication units comprises a laser diode or a laser diode and a backlight receiving photodiode set.

15. The multi-channel parallel optical communication module according to claim 7, wherein the optical communication assembly further comprises a plurality of optical isolators accommodated in the airtight cavity, and the plurality of optical isolators correspond to the plurality of optical communication units in number.

* * * * *